Oct. 11, 1932.                    N. W. MORSE                    1,881,848
                              LUBRICATING APPARATUS
                              Filed April 1, 1929
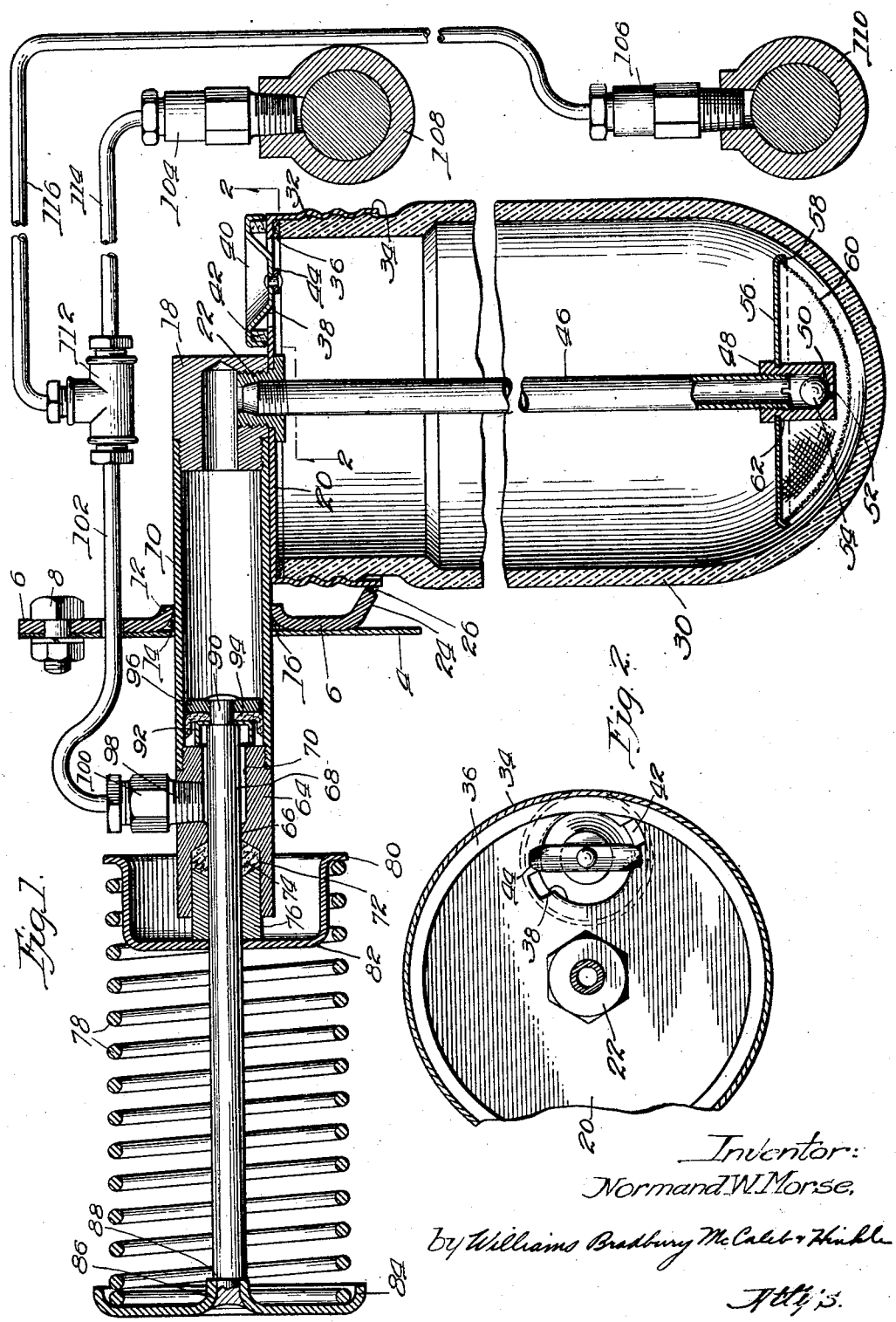
Inventor:
Normand W. Morse,
by Williams Bradbury McCalet + Hinkle
Attys.

Patented Oct. 11, 1932

1,881,848

UNITED STATES PATENT OFFICE

NORMAND W. MORSE, OF CHICAGO, ILLINOIS, ASSIGNOR TO ALEMITE CORPORATION, OF CHICAGO, ILLINOIS, A CORPORATION OF DELAWARE

LUBRICATING APPARATUS

Application filed April 1, 1929. Serial No. 351,513.

My invention relates, generally, to centralized lubricating apparatus and more particularly to an improved form of combined pump and reservoir installation for centralized lubricating systems. The invention is particularly useful in connection with centralized chassis lubricating systems for automotive vehicles.

It is an object of my invention to provide an improved pedally operable, double acting pump capable of delivering a small quantity of lubricant to the conduit system at high pressure and thereafter delivering a larger quantity of lubricant at a lower pressure.

It is a further object to provide a pump and reservoir installation of the above mentioned type which is simple in construction, may be economically manufactured, and which is easily operable.

Other objects will appear from the following description, reference being had to the accompanying drawing in which Figure 1 is a central vertical section through the pump and reservoir, the conduit arrangement being shown more or less diagrammatically in elevation; and Figure 2 is a transverse sectional view of the reservoir taken on the line 2—2 of Figure 1.

I have illustrated my invention as mounted upon a dash board 4 of an automotive vehicle, although it will be obvious that the pump and reservoir installation may be mounted in any other suitable manner upon or adjacent the machine to be lubricated. The pump and reservoir installation has a bracket 6 which may be secured to the dash board 4 in any suitable manner, as by bolts 8. A cylinder 10 passes through a rounded flanged opening formed in the bracket 6 and is welded to the flange 12 around this opening, as indicated at 14 and 16. The cylinder 10 is internally threaded at its forward end to receive an elbow fitting 18. A receptacle cover 20 is secured to the fitting 18 by a flanged bushing 22 threaded into the fitting. The receptacle cover 20 is also welded to a forwardly projecting lug 24 of the bracket 6 at the point 26, so that the cylinder 10, bracket 6 and receptacle cover 20 form a rigid unit when assembled and welded.

An elongated bowl-shaped glass lubricant reservoir 30 has molded threads 32 formed in its upper end which are adapted to co-operate with rolled threads formed in an annular flange 34 which is formed integrally with and depends from the receptacle cover 20. An annular gasket 36 makes possible a lubricant-tight joint between the upper edge of the reservoir 30 and its cover 20. The cover 20 has a suitable filling aperture 38 which is normally closed by a cap 40. The latter is shaped to receive an annular gasket 42 and has riveted thereto a cross piece 44, the ends of which are warped and thus serve tightly to hold the cap 40 upon the cover 20 when the former is rotated to a position such as shown in Figure 2.

An inlet pipe 46 has its upper end threaded in the bushing 22 and at its lower end carries a foot valve body 48. The body 48 has a valve seat 50 and an inlet aperture 52 at its lower end, a gravity actuated ball check valve 54 normally resting on said seat and closing the inlet aperture. A plate 56 is secured to the body 48 and has an inwardly and downwardly projecting annular flange 58 which serves as a retainer for a strainer 60 which is in the shape of a segment of the surface of a sphere. The plate 56 is preferably secured to the body 48 by passing over the upper end of the body until the plate rests upon an annular shoulder 62 on the body and the upper reduced diameter end portion of the body then riveted over to the shape as shown in Figure 1. This construction provides a rigid and oil-tight mounting for said plate.

The forward end of the cylinder 10 is threaded to receive a head 64 which has an axial bore 66 forming a guide for a piston rod 68 and has a counterbore 70 at one end forming an outlet passageway, and a counterbore 72 at the other end to receive a packing 74 which is held in position by a gland 76 slidable in the bore 72. This gland projects beyond the end of the head 64 and is normally pressed inwardly by a spring 78 which bears upon a flange 80 of a hat-shaped stamping 82. This stamping has a central aperture through which the rod 68 passes. The other end of the spring 78 bears against an annularly flanged pedal 84 which is pierced at its center to form a circular flange 86, the end of which abuts against a shoulder 88 formed near the end of the rod 68. The end of the rod 68 is riveted to the pedal 84. The inner end of the rod 68 has a portion 90 of reduced diameter over which a piston assembly comprising a cup-shaped stop and cup leather former 92, a cup leather washer 94 and a backing plate 96 are secured by riveting over the extremity of the reduced portion 90.

The head 64 is threaded at 98 to receive a tubing connection fitting 100 by which an outlet conduit 102 is secured. This conduit is the main line of a conduit system which leads to all of the bearings to be lubricated and is here diagrammatically illustrated as connected to suitable resistance unit fittings 104 and 106 associated with bearings 108 and 110, respectively, by a T 112 and conduits 114 and 116, respectively. The bearings 108 and 110 are representative of a large number of chassis bearings forming part of the automotive vehicle upon which the pump and reservoir installation is mounted. In lieu of the resistance units 104 and 106, measuring valves, or other means properly to proportion the discharge of the pump among the various bearings to be lubricated, may be used.

In operation the reservoir 30 is filled with a suitable lubricant through the filling opening 38 and the cap replaced by passing the ends of the cross piece 44 through the corresponding notches of the filling opening and rotating it. Assuming that the conduit system and pump are fully primed with lubricant, operation of the pump by applying pressure to the pedal 84 will compress the spring 78, moving the piston rod and piston forwardly. Due to the displacement of the piston rod as it enters the cylinder, lubricant will be forced from the cylinder under relatively high pressure, the check valve preventing return of the lubricant to the reservoir. The lubricant in front of the piston will readily pass to the rear thereof, past the cup leather 94. This ejection of lubricant to the bearings at high pressure is very desirable, since it serves to flush out any resistance units or bearings which may become slightly clogged with dirt or gummed with lubricant. The piston is moved forwardly until the plate 96 abuts against the fitting 18.

Upon removing the foot from the pedal 84, the spring 78 will force the piston and piston rod rearwardly and the lubricant behind the piston will be forced outwardly to the bearings at a relatively lower pressure. While the piston is moving forwardly the cylinder is primed by flow of lubricant past the check valve 54 and through the pipe 46, the strainer 60 preventing the entrance of any foreign matter into the pump. Since the piston will move forward rather slowly under the influence of the spring 78 (depending upon the viscosity of the lubricant and other conditions), the priming of the cylinder 10 with the charge of lubricant for the next operation will take place slowly, so that the strainer 60 may be of very fine mesh and still not interfere with the operation of the pump.

The glass reservoir 30 forms a very economical and convenient container for the supply of lubricant, making it possible at all times readily to ascertain the quantity of lubricant contained therein. The presence of foreign matter in the reservoir may be observed and the reservoir removed from the cover and support 20 and cleaned when an undue deposit of dirt is noted. When the reservoir is being filled with lubricant the plate 56 prevents the lubricant from falling directly upon the strainer 60 and thus eliminating the possibility of small air bubbles being carried through the strainer.

It will be noted that the spring 78 not only serves the purpose of returning the piston of the pump after operation thereof, but also maintains the packing 74 in tight sealing engagement with the rod 68 and eliminates the possibility of leakage or the necessity of taking up the wear in the packing.

The invention is capable of wide variation within equivalent limits and I contemplate such variation as may be desirable or useful in the particular adaptation of the invention shown, or in its adaptation to other devices. I do not restrict myself in any unessential particulars, but what I claim and desire to secure by Letters Patent is:

1. A combination pump and reservoir installation for automotive chassis lubricating systems, comprising a cylinder, a flanged mounting welded thereto, a fitting at the forward end of said cylinder, a receptacle cover and support secured to said fitting and welded to said mounting, a receptacle secured to said cover and depending therefrom, a head at the forward end of said cylinder, a piston in said cylinder, a rod secured to said piston and guided in said head, an outlet conduit connected to said head, and a spring to hold said rod and piston adjacent said head.

2. In a centralized lubricating system having a plurality of bearings to be lubricated, a branched conduit system for supplying lubricant to said bearings and means associated with each of said bearings for proportioning lubricant therebetween, a source of lubricant, a piston pump for forcing lubricant from said source into said conduit system, said pump being arranged to force lubricant into said system under high pressure upon application of manual force to the piston thereof during the forward stroke of the latter and to discharge lubricant to said conduit system at a relatively lower pressure upon the return stroke thereof, and a spring for actuating said piston upon its return stroke.

3. A combination pump and reservoir installation for automotive chassis lubricating systems, comprising a cylinder, a flanged mounting secured thereto, a fitting at the forward end of said cylinder, a reservoir cover and support secured to said fitting and to said mounting, a reservoir secured to said cover and depending therefrom, a head at the forward end of said cylinder, a cup leather piston in said cylinder, a rod secured to said piston and guided in said head, an outlet conduit connected to said head, a check valved inlet communicating with said fitting, and a spring to hold said rod and piston adjacent said head.

4. In a centralized lubricating system having a plurality of bearings to be lubricated, a branched conduit system for conveying lubricant to said bearings and resistance means associated with each of said bearings for restricting the flow of lubricant thereto, a source of lubricant, a cup leather piston and cylinder serving as a pump for forcing lubricant from said source into said conduit system, said pump being arranged to force lubricant into said system under high pressure upon application of manual force to the piston thereof during its forward stroke and upon the return stroke thereof to discharge lubricant to said conduit system at a lower pressure and at the same time draw a new charge of lubricant into the pump cylinder, and a spring for actuating said piston upon its return stroke.

5. In a centralized lubricating system and having a plurality of bearings to be lubricated, a branched conduit system for supplying lubricant to said bearings and means intermediate said conduit system and each of said bearings to regulate the quantity of lubricant supplied to each of said bearings, means for supplying a relatively small quantity of lubricant to said conduit system at high pressure and thereafter supplying a larger quantity of lubricant at a lower pressure.

6. In a centralized lubricating system, a glass bowl forming a lubricant reservoir, a cover for said bowl detachably secured thereto, a pump secured to said cover, and an attaching bracket rigidly secured to said pump and said cover and forming a bond therebetween.

7. A lubricant pump and reservoir unit for centralized lubricating systems, comprising a cover having a depending flange with threads rolled therein, means for rigidly supporting said cover upon a vehicle with which the unit is associated, a glass bowl having threads formed at its upper end whereby it may be screwed into the flange of said cover, a pipe depending into said bowl for withdrawing the lubricant therefrom, a foot valve body secured to the lower end of said pipe, a check valve in said body, a plate rigidly secured to said body and extending substantially to the wall of said bowl, and a concave strainer secured to the peripheral edge of said plate and covering the inlet opening of said foot valve body.

8. In a centralized lubricating system having a plurality of bearings to be lubricated, a branched conduit system for supplying lubricant to said bearings and means in said conduit system to regulate the quantity of lubricant supplied to each of said bearings, a pump comprising a cylinder and piston operative to supply a relatively small quantity of lubricant to said conduit system at high pressure and thereafter supplying a larger quantity of lubricant at a lower pressure while simultaneously priming the pump cylinder.

9. A lubricant pump and reservoir for centralized lubricating system, comprising a cover having a depending threaded flange, means for rigidly supporting said cover upon a vehicle with which the reservoir is associated, a glass bowl having threads formed at its upper end whereby it may be screwed into the flange of said cover, a pump cylinder secured to said cover, a pipe depending from said cylinder into said bowl for withdrawing the lubricant therefrom, a check valve in the lower end of said pipe, and a strainer secured to and covering the lower end of said pipe.

10. A pump unit for centralized chassis lubricating systems comprising a supporting bracket, a pump cylinder secured to said bracket, a source of lubricant connected to one end of said cylinder, a check valve to prevent flow of lubricant from said cylinder to said source, a cup leather piston reciprocable in said cylinder, a piston rod secured thereto and projecting from the other end of said cylinder and having a pedal at its extremity, a packing around said rod, a gland for compressing said packing, and a single spring to force said gland against said packing and to move said piston and rod throughout the return stroke thereof.

In witness whereof, I hereunto subscribe my name this 26th day of March, 1929.

NORMAND W. MORSE.